(12) United States Patent
Chadha et al.

(10) Patent No.: US 10,318,419 B2
(45) Date of Patent: Jun. 11, 2019

(54) FLUSH AVOIDANCE IN A LOAD STORE UNIT

(71) Applicant: International Business Machines Corporation, Armonk, NY (US)

(72) Inventors: Sundeep Chadha, Austin, TX (US); David A. Hrusecky, Cedar Park, TX (US); Elizabeth A. McGlone, Rochester, MN (US); George W. Rohrbaugh, III, Charlotte, VT (US); Shih-Hsiung S. Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/230,532

(22) Filed: Aug. 8, 2016

(65) Prior Publication Data

US 2018/0039577 A1    Feb. 8, 2018

(51) Int. Cl.
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1021* (2013.01); *G06F 2212/608* (2013.01)

(58) Field of Classification Search
CPC .............. G06F 12/10; G06F 12/0804; G06F 2212/1021; G06F 2212/1041; G06F 2212/281; G06F 2212/608; G06F 2212/657
See application file for complete search history.

(56) References Cited

U.S. PATENT DOCUMENTS

| | | | |
|---|---|---|---|
| 4,858,113 A | 8/1989 | Saccardi | |
| 5,055,999 A | 10/1991 | Frank et al. | |
| 5,095,424 A | 3/1992 | Woffinden et al. | |

(Continued)

FOREIGN PATENT DOCUMENTS

| | | |
|---|---|---|
| CN | 101021778 A | 8/2007 |
| CN | 101676865 A | 3/2010 |

(Continued)

OTHER PUBLICATIONS

U.S. Appl. No. 15/152,257, to Sundeep Chadha et al., entitled, *Operation of a Multi-Slice Processor Implementing a Load/Store Unit Maintaining Rejected Instructions*, assigned to International Business Machines Corporation, 37 pages, filed May 11, 2016.

(Continued)

*Primary Examiner* — Nanci N Wong
(74) *Attorney, Agent, or Firm* — Nathan M. Rau (57) ABSTRACT

Flush avoidance in a load store unit including launching a load instruction targeting an effective address; encountering a set predict hit and an effective-to-real address translator (ERAT) miss for the effective address, wherein the set predict hit comprises a cache address of a cache entry; sending a data valid message for the load instruction to an instruction sequencing unit; and verifying the data valid message, wherein verifying the data valid message comprises: tracking the cache entry during an ERAT update; and upon completion of the ERAT update, encountering an ERAT hit for the effective address in response to relaunching the load instruction.

20 Claims, 7 Drawing Sheets

(56) References Cited

U.S. PATENT DOCUMENTS

| | | |
|---|---|---|
| 5,353,426 A | 10/1994 | Patel et al. |
| 5,418,922 A | 5/1995 | Liu |
| 5,471,593 A | 11/1995 | Branigin |
| 5,475,856 A | 12/1995 | Kogge |
| 5,553,305 A | 9/1996 | Gregor et al. |
| 5,630,149 A | 5/1997 | Bluhm |
| 5,664,215 A | 9/1997 | Burgess et al. |
| 5,680,597 A | 10/1997 | Kumar et al. |
| 5,724,536 A | 3/1998 | Abramson et al. |
| 5,809,522 A | 9/1998 | Novak et al. |
| 5,809,530 A * | 9/1998 | Samra ............. G06F 12/0897 711/119 |
| 5,822,602 A | 10/1998 | Thusoo |
| 5,897,651 A | 4/1999 | Cheong et al. |
| 5,913,048 A | 6/1999 | Cheong et al. |
| 5,996,068 A | 11/1999 | Dwyer, III et al. |
| 6,021,485 A | 2/2000 | Feiste et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,098,166 A | 8/2000 | Leibholz et al. |
| 6,108,753 A * | 8/2000 | Bossen ............. G06F 11/141 711/118 |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,269,427 B1 | 1/2001 | Kuttanna et al. |
| 6,212,544 B1 | 4/2001 | Borkenhagen et al. |
| 6,237,081 B1 * | 5/2001 | Le ............. G06F 9/3836 712/205 |
| 6,286,027 B1 | 9/2001 | Dwyer, III et al. |
| 6,311,261 B1 | 10/2001 | Chamdani et al. |
| 6,336,168 B1 | 1/2002 | Frederick, Jr. et al. |
| 6,336,183 B1 | 1/2002 | Le et al. |
| 6,356,918 B1 | 3/2002 | Chuang et al. |
| 6,381,676 B2 | 4/2002 | Aglietti et al. |
| 6,418,513 B1 | 7/2002 | Arimilli et al. |
| 6,418,525 B1 * | 7/2002 | Charney ............. G06F 9/3806 711/128 |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,553,480 B1 * | 4/2003 | Cheong ............. G06F 9/3836 712/23 |
| 6,564,315 B1 | 5/2003 | Keller et al. |
| 6,654,876 B1 | 11/2003 | Le et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,847,578 B2 | 1/2005 | Ayukawa et al. |
| 6,868,491 B1 | 3/2005 | Moore |
| 6,883,107 B2 | 4/2005 | Rodgers et al. |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,350,056 B2 | 3/2008 | Abernathy et al. |
| 7,386,704 B2 | 6/2008 | Schulz et al. |
| 7,395,419 B1 | 7/2008 | Gonion |
| 7,398,374 B2 | 7/2008 | Delano |
| 7,401,188 B2 | 7/2008 | Matthews |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,509,484 B1 | 3/2009 | Golla et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,669,035 B2 | 2/2010 | Young et al. |
| 7,669,036 B2 | 2/2010 | Brown et al. |
| 7,685,410 B2 | 3/2010 | Shen et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,889,204 B2 | 2/2011 | Hansen et al. |
| 7,890,735 B2 | 2/2011 | Tran |
| 7,926,023 B2 | 4/2011 | Okawa et al. |
| 7,949,859 B2 | 5/2011 | Kalla et al. |
| 7,975,134 B2 | 7/2011 | Gonion |
| 7,987,344 B2 | 7/2011 | Hansen et al. |
| 8,041,928 B2 | 10/2011 | Burky et al. |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,131,942 B2 | 3/2012 | Harris et al. |
| 8,131,980 B2 | 3/2012 | Hall et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,151,012 B2 | 4/2012 | Kim et al. |
| 8,166,282 B2 | 4/2012 | Madriles et al. |
| 8,184,686 B2 | 5/2012 | Wall et al. |
| 8,219,783 B2 | 7/2012 | Hara |
| 8,219,787 B2 | 7/2012 | Lien et al. |
| 8,243,866 B2 | 8/2012 | Huang et al. |
| 8,250,341 B2 | 8/2012 | Schulz et al. |
| 8,271,765 B2 | 9/2012 | Bose et al. |
| 8,325,793 B2 | 12/2012 | Zhong |
| 8,335,892 B1 | 12/2012 | Minkin et al. |
| 8,386,751 B2 | 2/2013 | Ramchandran et al. |
| 8,402,256 B2 | 3/2013 | Arakawa |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,521,992 B2 | 8/2013 | Alexander et al. |
| 8,555,039 B2 | 10/2013 | Rychlik |
| 8,578,140 B2 | 11/2013 | Yokoi |
| 8,654,884 B2 | 2/2014 | Kerr |
| 8,656,401 B2 | 2/2014 | Venkataramanan et al. |
| 8,683,182 B2 | 3/2014 | Hansen et al. |
| 8,713,263 B2 | 4/2014 | Bryant |
| 8,793,435 B1 | 7/2014 | Ashcraft et al. |
| 8,806,135 B1 * | 8/2014 | Ashcraft ............. G06F 9/30043 711/122 |
| 8,850,121 B1 | 9/2014 | Ashcraft et al. |
| 8,929,496 B2 | 1/2015 | Lee et al. |
| 8,935,513 B2 | 1/2015 | Guthrie et al. |
| 8,966,232 B2 | 2/2015 | Tran |
| 8,984,264 B2 | 3/2015 | Karlsson et al. |
| 9,069,563 B2 | 6/2015 | Konigsburg et al. |
| 9,207,995 B2 | 12/2015 | Boersma et al. |
| 9,223,709 B1 | 12/2015 | O'Bleness et al. |
| 9,519,484 B1 | 12/2016 | Stark |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 9,934,033 B2 | 4/2018 | Cordes et al. |

(56) References Cited

U.S. PATENT DOCUMENTS

| | | | |
|---|---|---|---|
| 9,940,133 B2 | 4/2018 | Cordes et al. | |
| 9,983,875 B2 | 5/2018 | Chadha et al. | |
| 10,037,211 B2 | 7/2018 | Fernsler et al. | |
| 10,037,229 B2 | 7/2018 | Fernsler et al. | |
| 10,042,647 B2 | 8/2018 | Eickemeyer et al. | |
| 10,042,770 B2 | 8/2018 | Chadha et al. | |
| 2002/0078302 A1 | 6/2002 | Favor | |
| 2002/0138700 A1 | 9/2002 | Holmberg | |
| 2002/0194251 A1 | 12/2002 | Richter et al. | |
| 2003/0120882 A1 | 6/2003 | Granston et al. | |
| 2003/0163669 A1 | 8/2003 | Delano | |
| 2003/0182537 A1 | 9/2003 | Le et al. | |
| 2004/0111594 A1 | 6/2004 | Feiste et al. | |
| 2004/0162966 A1 | 8/2004 | Webb, Jr. et al. | |
| 2004/0172521 A1 | 9/2004 | Hooker et al. | |
| 2004/0181652 A1 | 9/2004 | Ahmed et al. | |
| 2004/0216101 A1 | 10/2004 | Burky et al. | |
| 2005/0060518 A1 | 3/2005 | Augsburg et al. | |
| 2005/0138290 A1 | 6/2005 | Hammarlund et al. | |
| 2006/0095710 A1 | 5/2006 | Pires Dos Reis Moreira et al. | |
| 2006/0106923 A1 | 5/2006 | Balasubramonian et al. | |
| 2006/0143513 A1* | 6/2006 | Hillman | G06F 11/1658 714/13 |
| 2007/0022277 A1 | 1/2007 | Iwamura et al. | |
| 2007/0079303 A1 | 4/2007 | Du et al. | |
| 2007/0101102 A1 | 5/2007 | Dierks, Jr. et al. | |
| 2007/0106874 A1* | 5/2007 | Pan | G06F 12/10 711/206 |
| 2007/0180221 A1 | 8/2007 | Abernathy et al. | |
| 2007/0204137 A1 | 8/2007 | Tran | |
| 2008/0098260 A1 | 4/2008 | Okawa et al. | |
| 2008/0104375 A1 | 5/2008 | Hansen et al. | |
| 2008/0133885 A1 | 6/2008 | Glew | |
| 2008/0162889 A1 | 7/2008 | Cascaval et al. | |
| 2008/0162895 A1 | 7/2008 | Luick | |
| 2008/0172548 A1 | 7/2008 | Caprioli et al. | |
| 2008/0270749 A1 | 10/2008 | Ozer et al. | |
| 2008/0307182 A1 | 12/2008 | Arimilli et al. | |
| 2008/0313424 A1 | 12/2008 | Gschwind | |
| 2009/0037698 A1 | 2/2009 | Nguyen | |
| 2009/0113182 A1 | 4/2009 | Abernathy et al. | |
| 2009/0198921 A1 | 8/2009 | Chen et al. | |
| 2009/0210675 A1 | 8/2009 | Alexander et al. | |
| 2009/0240929 A1 | 9/2009 | Hutton et al. | |
| 2009/0265532 A1 | 10/2009 | Caprioli et al. | |
| 2009/0282225 A1 | 11/2009 | Caprioli et al. | |
| 2009/0300319 A1 | 12/2009 | Cohen et al. | |
| 2010/0100685 A1 | 4/2010 | Kurosawa et al. | |
| 2010/0161945 A1 | 6/2010 | Burky et al. | |
| 2010/0191940 A1 | 7/2010 | Mejdrich et al. | |
| 2010/0262781 A1 | 10/2010 | Hrusecky et al. | |
| 2011/0078697 A1* | 3/2011 | Smittle | G06F 9/3836 718/104 |
| 2012/0060015 A1 | 3/2012 | Eichenberger et al. | |
| 2012/0066482 A1 | 3/2012 | Gonion | |
| 2012/0110271 A1 | 5/2012 | Boersma et al. | |
| 2012/0110304 A1 | 5/2012 | Bryant et al. | |
| 2012/0226865 A1* | 9/2012 | Choi | G06F 13/1642 711/121 |
| 2012/0246450 A1 | 9/2012 | Abdallah | |
| 2013/0254488 A1* | 9/2013 | Kaxiras | G06F 12/0815 711/130 |
| 2013/0305022 A1 | 11/2013 | Eisen et al. | |
| 2013/0339670 A1 | 12/2013 | Busaba | |
| 2014/0025933 A1 | 1/2014 | Venkataramanan et al. | |
| 2014/0040599 A1 | 2/2014 | Fleischer et al. | |
| 2014/0075159 A1 | 3/2014 | Frigo et al. | |
| 2014/0189243 A1 | 7/2014 | Cuesta et al. | |
| 2014/0215189 A1 | 7/2014 | Airaud et al. | |
| 2014/0223144 A1 | 8/2014 | Heil et al. | |
| 2014/0244239 A1 | 8/2014 | Nicholson et al. | |
| 2014/0281408 A1 | 9/2014 | Zeng | |
| 2014/0282429 A1 | 9/2014 | Archer et al. | |
| 2014/0325188 A1 | 10/2014 | Ogasawara | |
| 2015/0046662 A1 | 2/2015 | Heinrich et al. | |
| 2015/0121010 A1 | 4/2015 | Kaplan et al. | |
| 2015/0121046 A1 | 4/2015 | Kunjan et al. | |
| 2015/0134935 A1 | 5/2015 | Blasco | |
| 2015/0199272 A1 | 7/2015 | Goel et al. | |
| 2015/0324204 A1 | 11/2015 | Eisen et al. | |
| 2015/0324205 A1 | 11/2015 | Eisen et al. | |
| 2015/0324206 A1 | 11/2015 | Eisen et al. | |
| 2015/0324207 A1 | 11/2015 | Eisen et al. | |
| 2016/0070571 A1 | 3/2016 | Boersma et al. | |
| 2016/0070574 A1 | 3/2016 | Boersma et al. | |
| 2016/0092231 A1 | 3/2016 | Chu et al. | |
| 2016/0092276 A1 | 3/2016 | Chu et al. | |
| 2016/0103715 A1 | 4/2016 | Sethia et al. | |
| 2016/0202986 A1 | 7/2016 | Ayub et al. | |
| 2016/0202988 A1 | 7/2016 | Ayub et al. | |
| 2016/0202989 A1 | 7/2016 | Eisen et al. | |
| 2016/0202990 A1 | 7/2016 | Brownscheidle et al. | |
| 2016/0202991 A1 | 7/2016 | Eisen et al. | |
| 2016/0202992 A1 | 7/2016 | Brownscheidle et al. | |
| 2016/0239307 A1 | 8/2016 | Alexander et al. | |
| 2017/0168837 A1 | 6/2017 | Eisen et al. | |
| 2017/0255465 A1 | 9/2017 | Chadha et al. | |
| 2017/0277542 A1 | 9/2017 | Fernsler et al. | |
| 2017/0277543 A1 | 9/2017 | McGlone et al. | |
| 2017/0300328 A1 | 10/2017 | Cordes et al. | |
| 2017/0329641 A1 | 11/2017 | Chadha et al. | |
| 2017/0329713 A1 | 11/2017 | Chadha et al. | |
| 2017/0351521 A1 | 12/2017 | Hrusecky | |
| 2017/0357507 A1 | 12/2017 | Cordes et al. | |
| 2017/0357508 A1 | 12/2017 | Cordes et al. | |
| 2017/0371658 A1 | 12/2017 | Eickemeyer et al. | |
| 2018/0067746 A1 | 3/2018 | Chu et al. | |
| 2018/0260230 A1 | 9/2018 | Eickemeyer et al. | |
| 2018/0276132 A1 | 9/2018 | Chadha et al. | |
| 2018/0285161 A1 | 10/2018 | Chadha et al. | |
| 2018/0293077 A1 | 10/2018 | Fernsler et al. | |

FOREIGN PATENT DOCUMENTS

| | | |
|---|---|---|
| CN | 101876892 A | 11/2010 |
| CN | 102004719 A | 4/2011 |
| EP | 1212680 B1 | 7/2007 |
| GB | 2356324 A | 5/2001 |
| GB | 2356324 B | 10/2001 |
| JP | 2009157887 A | 7/2009 |
| WO | WO 2015/067118 A1 | 5/2015 |

OTHER PUBLICATIONS

U.S. Appl. No. 15/180,838, to Robert A. Cordes et al., entitled, *Operation of a Multi-Slice Processor Implementing Simultaneous Two-Target Loads and Stores*, assigned to International Business Machines Corporation, 37 pages, filed Jun. 13, 2016.

U.S. Appl. No. 15/193,338, to Richard J. Eickemeyer et al., entitled, *Managing a Divided Load Reorder Queue*, assigned to International Business Machines Corporation, 35 pages, filed Jun. 27, 2016.

U.S. Appl. No. 15/219,638, to Robert A. Cordes et al., entitled, *Operation of a Multi-Slice Processor Implementing Simultaneous Two-Target Loads and Stores*, assigned to International Business Machines Corporation, 37 pages, filed Jul. 26, 2016.

U.S. Appl. No. 15/221,035, to Sundeep Chadha et al., entitled, *Operation of a Multi-Slice Processor Implementing a Load/Store Unit Maintaining Rejected Instructions*, assigned to International Business Machines Corporation, 37 pages, filed Jul. 27, 2016.

Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.

Anonymous, *Method and system for Implementing "Register Threads" in a Simultaneously-Multithreaded (SMT) Processor Core*, An IP.com Prior Art Database Technical Disclosure, IP.com No. IPCOM000199825D IP.com Electronic Publication: Sep. 17, 2010 pp. 1-4 <http://ip.com/IPCOM/000199825>.

(56) References Cited

OTHER PUBLICATIONS

Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.

Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.

Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-765, vol. 1685, Spring Berlin Heidelberg, Toulouse, France.

Pechanek et al., *The ManArray Embedded Processor Architecture*, Proceedings of the 26 Euromicro Conference, IEEE Computer Society, Sep. 5-7, 2000, pp. 348-355, vol. 1, Maastricht.

Anonymous, *Precise Merging Translation Queue in a Slice-Based Processor*, An IP.com Prior Art Database Technical Disclosure, IP.com No. IPCOM000249317D IP.com Electronic Publication: Feb. 16, 2017, pp. 1-3. <https://priorart.ip.com/IPCOM/000249317 >.

Appendix P; List of IBM Patent or Applications Treated as Related, Oct. 18, 2017, 2 pages.

U.S. Appl. No. 15/173,078 to David A. Hrusecky et al., entitled, *Fetched Data in an Ultra-Short Piped Load Store Unit*, assigned to International Business Machines Corporation, 25 pages, filed Jun. 3, 2016.

International Search Report and Written Opinion, PCT/IB2015/052741, dated Oct. 9, 2015.

Roth, *Store Vulnerability Window (SVW): Re-Execution Filtering for Enhanced Load/Store Optimization*, Technical Reports (CIS), Paper 35, Jan. 2004, 23 pages, University of Pennsylvania Scholarly Commons (online), <https://repository.upenn.edu/cgi/viewcontent.cgi?referer=https://www.google.com/&httpsredir=1&article=1023&context=cis_reports>.

Bobba et al., *Safe and Efficient Supervised Memory Systems*, 17th International Symposium on High Performance Computer Architecture (HPCA), Feb. 2011, 12 pages, IEEE xPlore Digital Library (online; IEEE.org), DOI: 10.1109/HPCA.2011.5749744.

Anonymous, "A Novel Data Prefetch Method Under Heterogeneous Architecture", IP.com Prior Art Database Technical Disclosure No. 000224167 (online), Dec. 2012, 14 pages, URL: http://ip.com/IPCOM/000224167.

Anonymous, "Method and System for Predicting Performance Trade-Offs During Critical Path Execution in a Processor", IP.com Prior Art Database Technical Disclosure No. 000223340 (online), Nov. 2012, 7 pages, URL: http://ip.com/IPCOM/000223340.

IBM, "Using a mask to block the wakeup of dependents of already-issued instructions", An IP.com Prior Art Database Technical Disclosure (online), IP.com No. 000193322, URL: http://ip.com/IPCOM/000193322, dated Feb. 18, 2010, 2 pages.

Anonymous, "Fast wakeup of load dependent instructions by a select bypass", An IP.com Prior Art Database Technical Disclosure (online), IP.com No. 000216900, URL: http://ip.com/IPCOM/000216900, dated Apr. 23, 2012, 2 pages.

Kalla, et al., "IBM Power5 Chip: A Dual-Core Multithreaded Processor", IEEE Micro, vol. 24, No. 2, Mar. 2004, pp. 40-47, IEEE Xplore Digital Library (online), DOI: 10.1109/MM.2004.1289290.

Mathis et al., "Characterization of simultaneous multithreading (SMT) efficiency in POWER5", IBM Journal of Research and Development, Jul. 2005, pp. 555-564, vol. 49, No. 4/5, International Business Machines Corporation, Armonk, NY.

Appendix P; List of IBM Patent or Applications Treated as Related, Sep. 23, 2016, 2 pages.

Slota et al., *Complex Network Analysis using Parallel Approximate Motif Counting*, 2014 IEEE 28th International Parallel & Distributed Processing Symposium, DOI: 10.1109/IPDPS.2014.50, Date Added to IEEE Xplore: Aug. 14, 2014, 10 pages.

Gorentla et al., *Exploring the All-to-All Collective Optimization Space with ConnectX CORE-Direct, IEEE*, 2012 41st International Confererence on Parallel Processing, DOI: 10.1109/ICPP.2012.28, Date Added to IEEE Xplore: Oct. 25, 2012, 10 pages.

Appendix P; List of IBM Patent or Applications Treated as Related, Aug. 28, 2018, 2 pages.

U.S. Appl. No. 15/995,850, to Sundeep Chadha et al., entitled, *Operation of a Multi-Slice Processor Implementing a Load/Store Unit Maintaining Rejected Instructions*, assigned to International Business Machines Corporation, 37 pages, filed Jun. 1, 2018.

U.S. Appl. No. 15/997,863, to Sundeep Chadha et al., entitled, *Operation of a Multi-Slice Processor Implementing a Load/Store Unit Maintaining Rejected Instructions*, assigned to International Business Machines Corporation, 37 pages, filed Jun. 5, 2018.

U.S. Appl. No. 16/003,950, to Kimberly M. Fernsler et al., entitled, *Operation of a Multi-Slice Processor With an Expanded Merge Fetching Queue*, assigned to International Business Machines Corporation, 35 pages, filed Jun. 8, 2018.

Sha et al., "Scalable Store-Load Forwarding via Store Queue Index Prediction", Proceedings of the $38^{th}$ Annual IEEE/ACM International Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

\* cited by examiner

FLUSH AVOIDANCE IN A LOAD STORE UNIT

BACKGROUND

Field of the Invention

The field of the invention is data processing, or, more specifically, methods, apparatus, and products for flush avoidance in a load store unit.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for flush avoidance in a load store unit are disclosed in this specification. Flush avoidance in a load store unit includes launching a load instruction targeting an effective address; encountering a set predict hit and an effective-to-real address translator (ERAT) miss for the effective address, wherein the set predict hit comprises a cache address of a cache entry; sending a data valid message for the load instruction to an instruction sequencing unit; and verifying the data valid message, wherein verifying the data valid message comprises: tracking the cache entry during an ERAT update; and upon completion of the ERAT update, encountering an ERAT hit for the effective address in response to relaunching the load instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
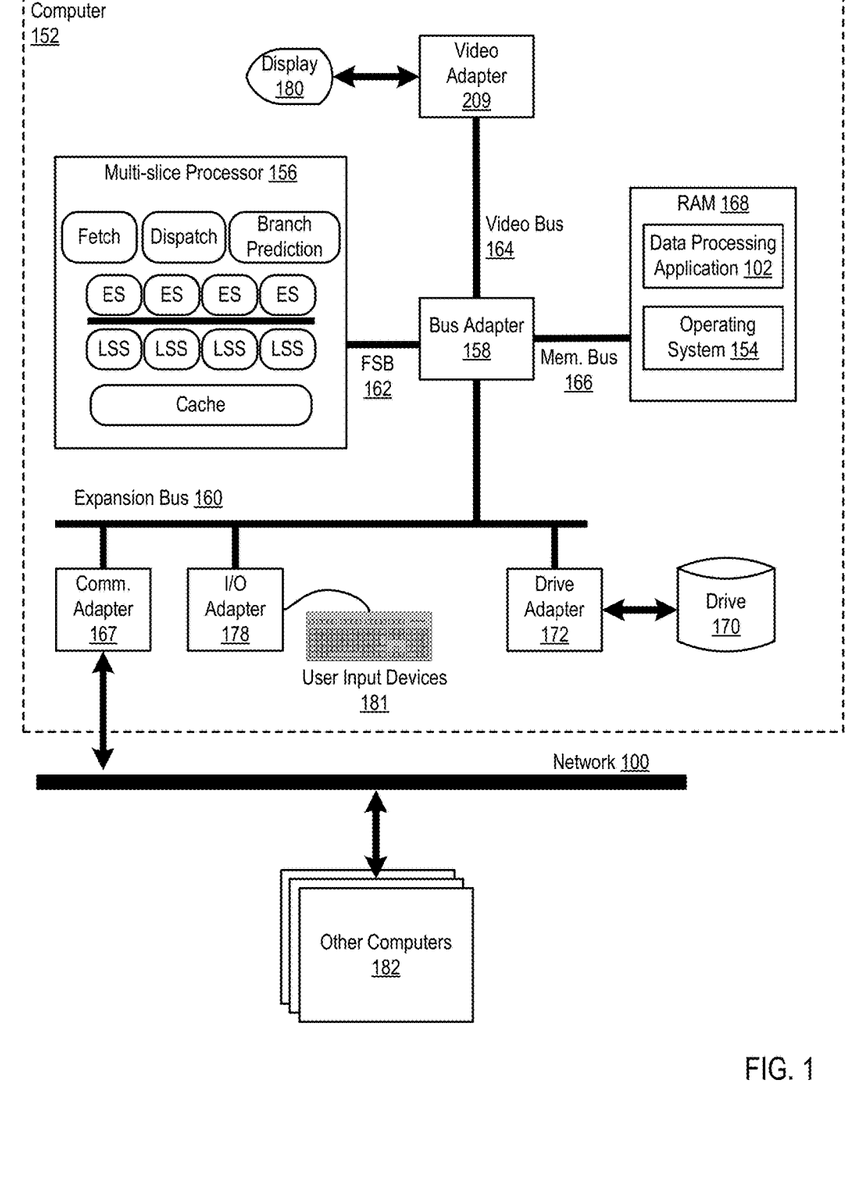
FIG. 1 sets forth a block diagram of an example system configured for flush avoidance in a load store unit according to embodiments of the present invention.

Exemplary methods and apparatus for flush avoidance in a load store unit in accordance with the present invention are described with reference to the accompanying drawings, beginning with FIG. 1. FIG. 1 sets forth a block diagram of an example system configured flush avoidance in a load store unit according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
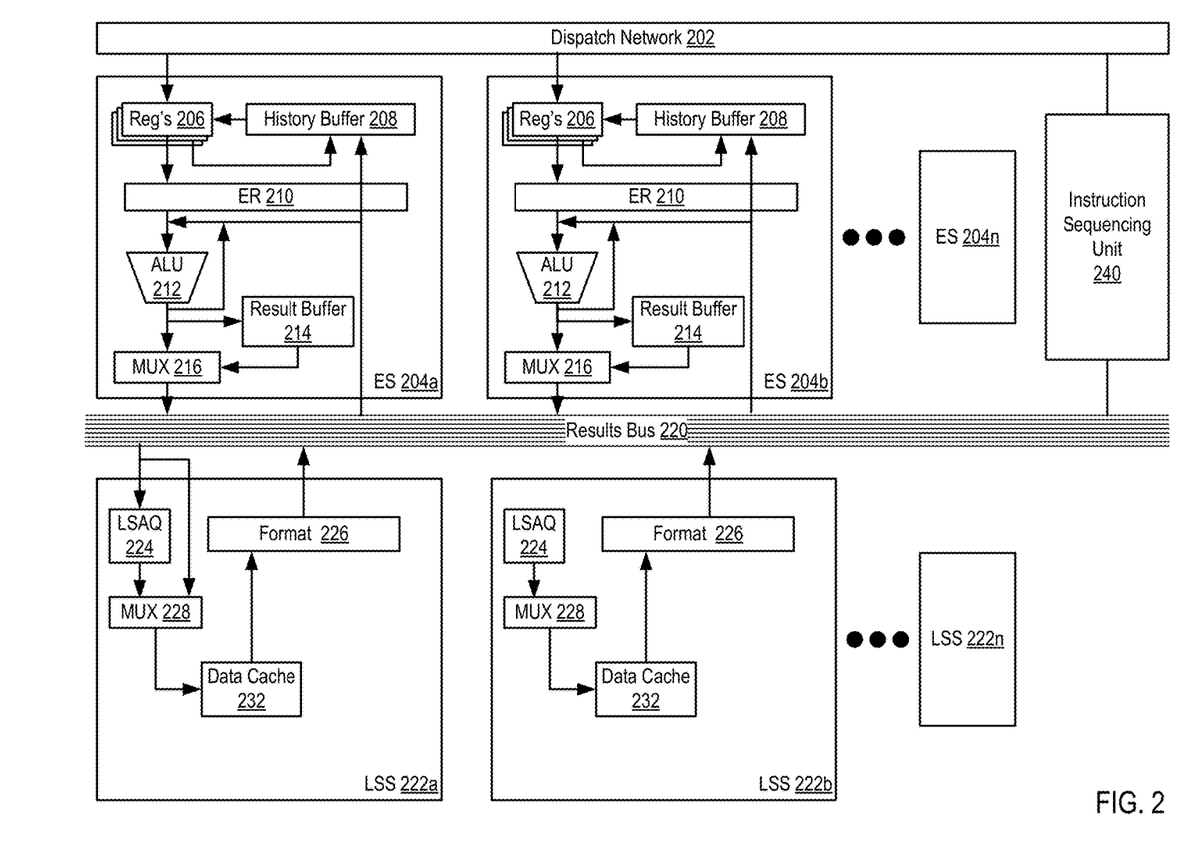
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
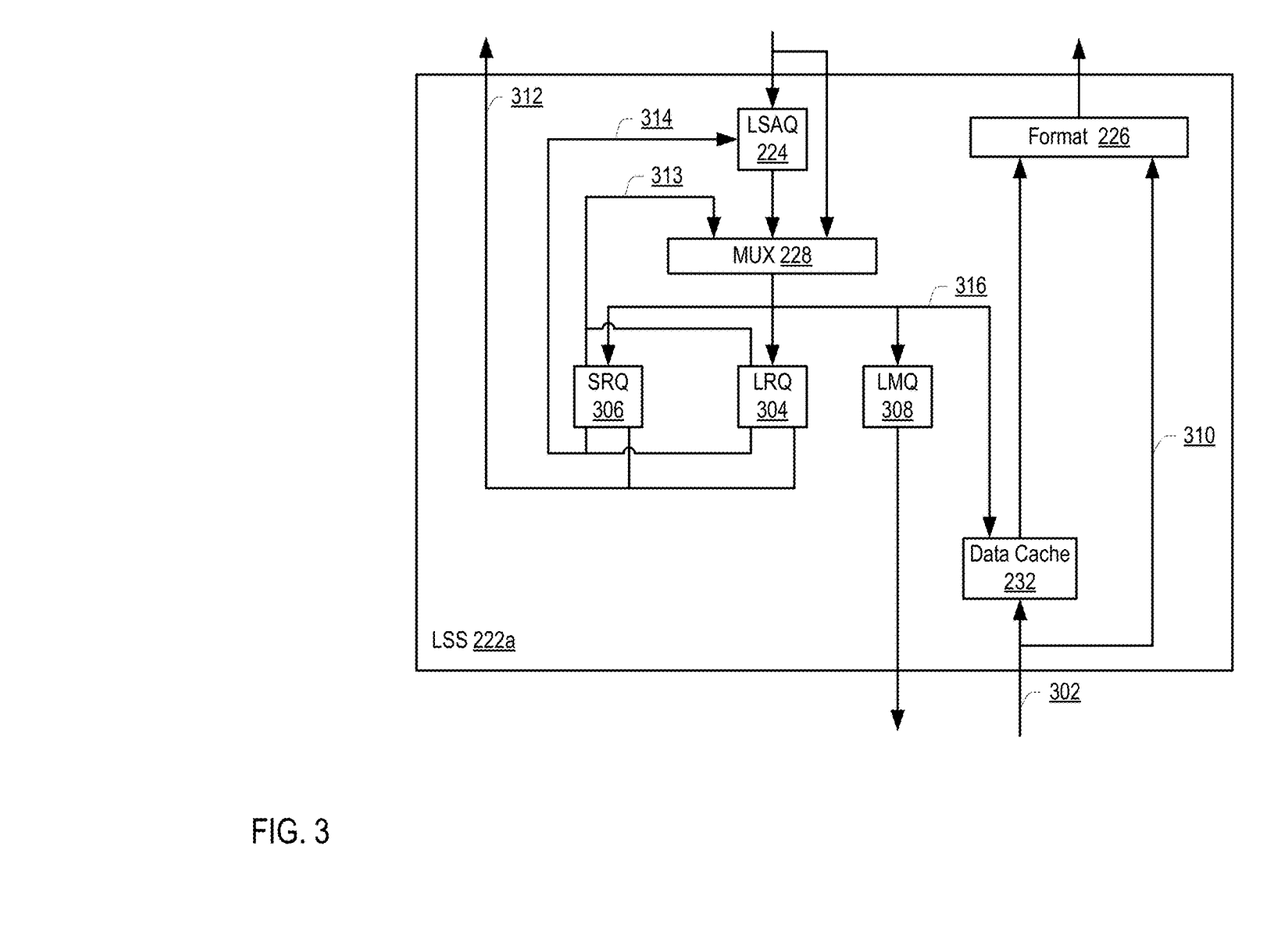
FIG. 3 sets forth a block diagram of a portion of a load/store slice of a multi-slice processor according to embodiments of the present invention.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), a data cache (232), among other components. The load/store access queue (224) may propagate an instruction through MUX (228) along line (316) to the load reorder queue (304) or the store reorder queue (306).

In previous systems, if a load/store unit received an instruction from an instruction sequencing unit, and the load/store unit was unable to handle the instruction for some reason, then the load/store unit would notify the instruction sequencing unit that the instruction was being rejected and the load/store unit would discard information related to the rejected instruction. In which case, the instruction sequencing unit would continue maintaining information to track and maintain the rejected instruction until the instruction is resent to the load/store unit. An instruction may be rejected for a variety of reasons, including an address miss in an address translation cache, a set prediction miss, data cache banking collisions, an overload of the load miss queue (308), among other possible rejection conditions.

The load/store slice (222a), by contrast to the above previous system, is configured to determine a rejection condition for an instruction received from an instruction sequencing unit, however, the load/store slice (222a), instead of sending a reject signal to the instruction sequencing unit, maintains tracking and handling of the instruction—including information usable to relaunch or reissue the instruction—until the rejection condition is resolved. Further, an entry in the load reorder queue (304) or the store reorder queue (306) may be configured to maintain information for tracking an instruction that would otherwise have been rejected and removed from the load reorder queue (304). For example, if the load/store slice (222a) determines that a rejection condition exists for a given load or store instruction, then logic within the load/store slice may notify the load reorder queue (304) or the store reorder queue (306) to place the instruction in a sleep state for a given number of cycles, or to place the instruction in a sleep state until notified to awaken, or to immediately reissue the instruction, among other notifications to perform other operations.

In this way, the load/store slice (222a) may save cycles that would otherwise be lost if the instruction were rejected to the instruction sequencing unit because the load/store slice (222a) may more efficiently and quickly reissue the instruction when the rejection condition is resolved in addition to more quickly detecting resolution of a rejection condition than an instruction sequencing unit. For example, if the load/store slice (222a) determines that an instruction that is in a sleep state may be reissued in response to determining that one or more rejection conditions have been resolved preventing the instruction from completing, then the load/store store slice may notify the load reorder queue (304) or the store reorder queue (306) to relaunch or reissue the instruction immediately or after some number of cycles. The number of cycles may depend upon a type of rejection condition or upon other factors affecting reissue or relaunch of the instruction. In this example, the load reorder queue (304) or the store reorder queue (306) may reissue or relaunch an instruction by providing the load/store access queue (224) with information to reissue the instruction, where the load reorder queue (304) or the store reorder queue (306) may communicate with the load/store access queue (224) along line (314) and may provide data for reissuing or relaunching the instruction along line (313).

Another improvement that results from the load/store slice (222a) maintaining an instruction if a rejection condition is determined is that the load/store slice (222a) uses fewer resources, such as logic and circuitry for latches and other components, to maintain the instruction than an instruction sequencing unit. In other words, given that the instruction sequencing unit may rely on the load/store slice (222a) in handling the instruction to completion, the instruction sequencing unit may free resources once the instruction is provided to the load/store slice (222a).

Further, the instruction sequencing unit (240), based at least in part on communications with the load/store slice (222a), may determine when and whether to wake instructions that may be dependent on a current instruction being handled by the load/store slice (222a). Therefore, if the load/store slice (222a) determines that a rejection condition exists, the load/store slice (222a) delays a notification to the instruction sequencing unit (240) to awaken dependent instructions to prevent the instruction sequencing unit (240) from issuing dependent instructions that are subsequently unable to finish due to lack of availability of results from a current instruction. In this way, the instruction sequencing unit (240) may avoid wasting execution cycles reissuing dependent instructions that are unable to finish.

For example, the load/store slice (222a) may communicate with the instruction sequencing unit (240) through the generation of signals indicating, at different points in handling a load instruction, that a load instruction is to be reissued or that data for a load instruction is valid. In some cases, in response to the instruction sequencing unit (240) receiving a signal from the load/store slice (222a) that a given instruction is to be reissued, the instruction sequencing unit (240) may awaken instructions dependent upon the given instruction with the expectation that the given instruction, after being reissued, is going to finish and provide valid data.

The load/store slice (222a) may also retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Figure 4:
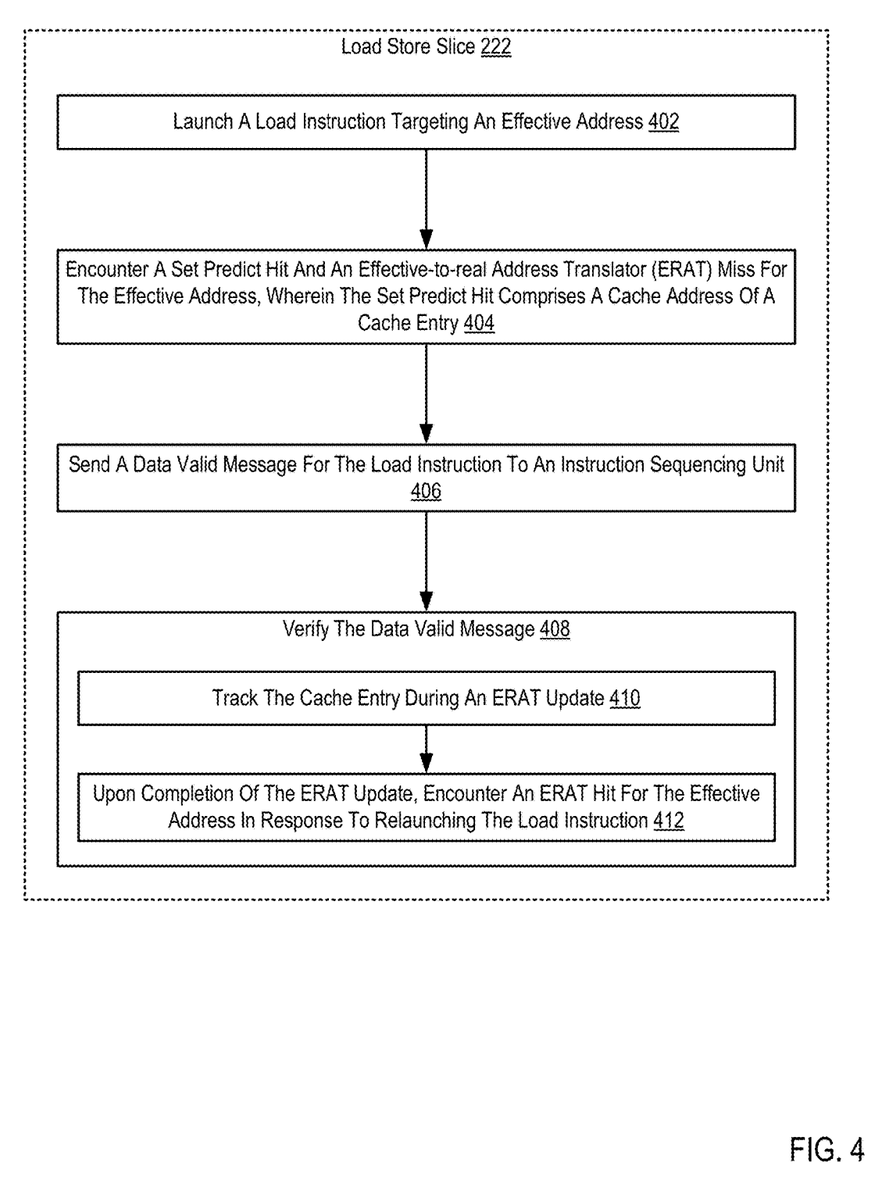
FIG. 4 sets forth a flow chart illustrating an exemplary method for flush avoidance in a load store unit according to embodiments of the present invention.

For further explanation, FIG. 4 sets forth a flow chart illustrating an exemplary method for flush avoidance in a load store unit. The method of FIG. 4 may be carried out by a multi-slice processor similar to that in the examples of FIGS. 1-3. Such a multi-slice processor may include an instruction sequencing unit (240), and a plurality of load/store slices (222a-222n), where each of the load/store slices may implement a load/store access queue (224), a load reorder queue (304), and a store reorder queue (306), as described above with regard to FIG. 3.

The method of FIG. 4 includes launching (402) a load instruction targeting an effective address. Launching (402) a load instruction targeting an effective address may be carried out by issuing, from the instruction sequencing unit (240), the load instruction to the LSS (222) (also referred to as the load store unit (LSU)). Once issued, the load instruction may be placed in an LRQ to await launching. Launching the load instruction includes attempting to access data identified by an effective address.

A load instruction is an instruction that reads data from memory (such as data cache (232)) and stores that data in a register. The load instruction may be an internal operation decoded from a processor instruction. The load instruction may include an address, such as an effective address, of the data to be loaded into the register.

The method of FIG. 4 includes encountering (404) a set predict hit and an effective-to-real address translator (ERAT) miss for the effective address, wherein the set predict hit comprises a cache address of a cache entry. A set predict mechanism is a mechanism that may provide a speculative initial response to a query to access data from the data cache (232). The set predict mechanism may provide a response with very short latency but with a potential for inaccuracy (e.g., falsely express a set predict hit). A set predict hit or miss is encountered during an attempt to read data from the data cache (232). A set predict hit indicates that the data stored at the provided effective address is stored in the data cache (232) at the provided cache address. A set predict miss indicates that the data stored at the provided effective address is not currently stored in the data cache (232). Once a set predict hit is encountered for a load instruction, the LSS (222) immediately begins reading data at the cache address provided by the set predict mechanism.

Set predict hits are verified by a directory mechanism. The directory mechanism definitively determines whether the data stored at the effective address is currently stored in the data cache (232). The directory mechanism has a higher latency, and may not complete before the LSS (222) begins reading data from the data cache (232). In the event that the directory mechanism determines that the set predict mechanism provided an inaccurate hit (i.e., the data for an effective address is not currently stored in the data cache (232)), then a flush indication is sent to the instruction sequencing unit (240), indicating that the results of the load instruction and each instruction following or dependent upon the load instruction, should be invalidated and the load instruction should be reissued.

An ERAT is a data structure that contains effective addresses and corresponding real addresses previously translated by the directory mechanism. An ERAT may include a content addressable memory with effective address entries, and a random access memory with real address entries. The size of the ERAT may be limited. Accordingly, the ERAT may have a high turn-over rate in that entries in the ERAT are frequently replaced. ERAT entries may be replaced based on any number of algorithms, such as least recently used.

An ERAT hit indicates that the provided effective address has a real address entry in the ERAT. The ERAT miss may indicate that the provided effective address does not have a real address entry in the ERAT. An ERAT miss may be encountered because the data for the effective address is not stored in the data cache (232). Alternatively, an ERAT miss may be encountered because the entry for the effective address is no longer in the ERAT, even though the data for the effective address is currently stored in a cache entry in the data cache (232). The number of entries in the ERAT may be less than the number of cache entries in the data cache (232). Consequently, the ERAT may not include an entry for each cache entry in the data cache (232).

The method of FIG. 4 includes sending (406) a data valid message for the load instruction to an instruction sequencing unit (240). Sending (406) a data valid message for the load instruction to an instruction sequencing unit (240) may be carried out by signaling, to the instruction sequencing unit (240), that the load instruction was successfully executed. Specifically, sending the data valid message indicates, to the instruction sequencing unit (240), that the load instruction accessed the data for the effective address from the data cache (232), and that the accessed data is the correct data (i.e., the data the load instruction intended to read). The data valid message may include an identifier of the load instruction.

The data valid message may be sent based on a reliance on the accuracy of the set predict hit, despite having received the ERAT miss. The data valid message may be sent even though the directory mechanism may later determine that the data read by the load instruction was not the intended data (i.e., the set predict mechanism provided a cache address that did not store the data for the effective address). In such a case, a flush indication is sent after the directory mechanism determines that the data read by the load instruction was not the intended data.

The method of FIG. 4 includes verifying (408) the data valid message. Verifying (408) the data valid message may be performed by the LSS (222) after the data valid message has been sent to the instruction sequencing unit (240). The verification may be internal to the LSS (222) (i.e., no further affirmative indications need be sent to the instruction sequencing unit (240)). A flush indication may be sent in response to a verification failure.

Verifying (408) the data valid message may be carried out by tracking (410) the cache entry during an ERAT update; and upon completion of the ERAT update, encountering (412) an ERAT hit for the effective address in response to relaunching the load instruction. Tracking (410) the cache entry during an ERAT update may be carried out by placing a tracker in an ERAT miss queue to monitor the cache entry; and determining that the cache entry is unchanged upon completion of the ERAT update.

The ERAT update process is a process by which one or more entries for an effective address are added to the ERAT. The added entries in the ERAT may be entries already in a lookaside buffer, and may replace other entries in the ERAT, such as the least recently used entries. The added entries may be for effective addresses that refer to data that is currently stored in the data cache (232). The ERAT update process may take multiple cycles to complete.

Encountering (412) an ERAT hit for the effective address in response to relaunching the load instruction may be carried out by relaunching the load instruction from the LRQ for the purposes of determining whether the load instruction encounters an ERAT hit or an ERAT miss. Relaunching the load instruction may not initiate a reading of the cacheline from the cache entry identified by the cache address. Encountering the ERAT hit upon relaunching the load instruction indicates that the data for the effective address is stored in the data cache (232) and was correctly read by the initial launching of the load instruction.

Figure 5:
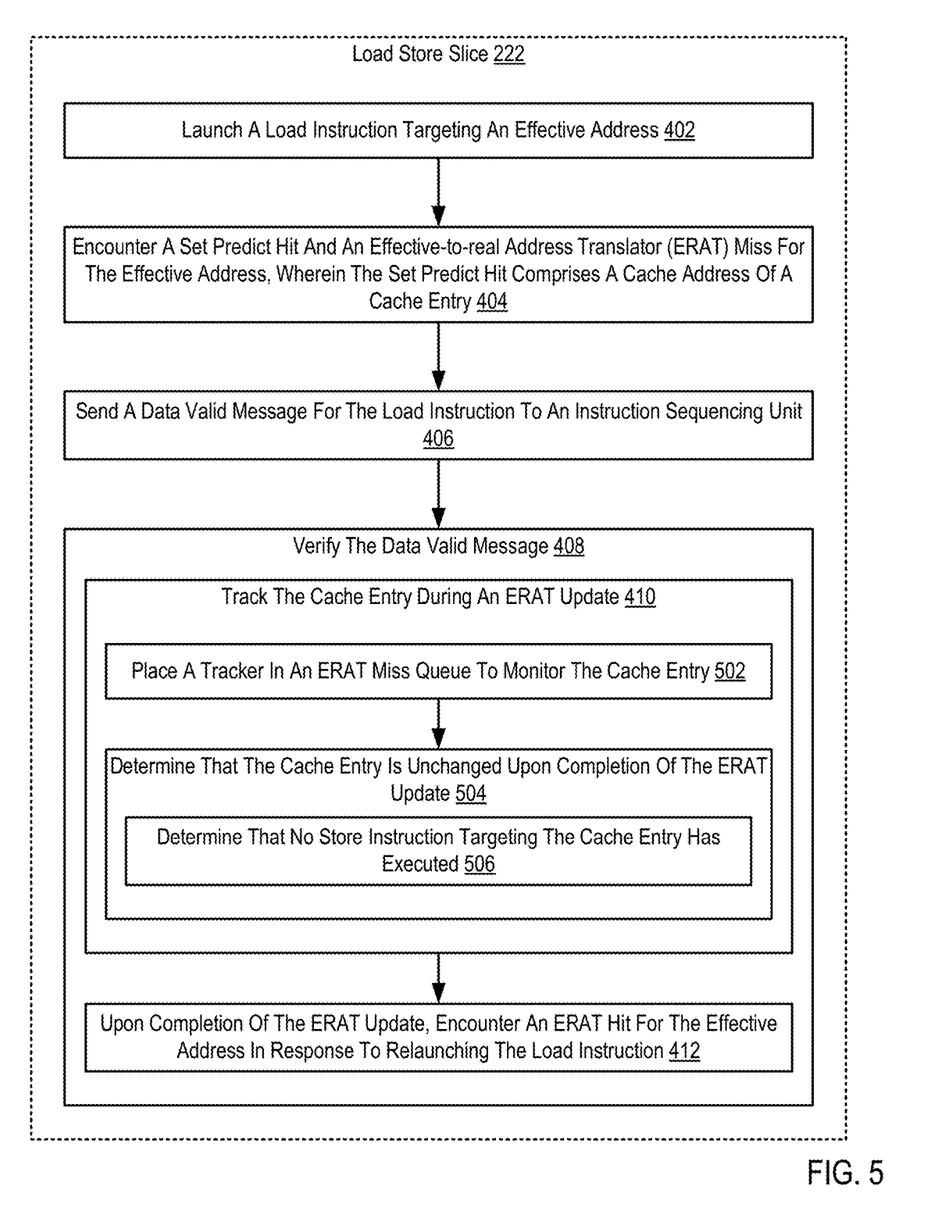
FIG. 5 sets forth a flow chart illustrating an exemplary method for flush avoidance in a load store unit according to embodiments of the present invention.

For further explanation, FIG. 5 sets forth a flow chart illustrating an exemplary method for flush avoidance in a load store unit according to embodiments of the present invention that includes launching (402) a load instruction targeting an effective address; encountering (404) a set predict hit and an ERAT miss for the effective address, wherein the set predict hit comprises a cache address of a cache entry; sending (406) a data valid message for the load instruction to an instruction sequencing unit (240); and verifying (408) the data valid message, wherein verifying the data valid message comprises: tracking (410) the cache entry during an ERAT update; and upon completion of the ERAT update, encountering (412) an ERAT hit for the effective address in response to relaunching the load instruction.

The method of FIG. 5 differs from the method of FIG. 4, however, in that tracking (410) the cache entry during an ERAT update includes placing (502) a tracker in an ERAT miss queue to monitor the cache entry; and determining (504) that the cache entry is unchanged upon completion of the ERAT update, including determining (506) that no store instruction targeting the cache entry has executed.

Placing (502) a tracker in an ERAT miss queue to monitor the cache entry may be carried out by storing or initializing an element within an entry in the ERAT miss queue. The ERAT miss queue contains the effective addresses and other information for instructions that encounter an ERAT miss while the address translation process by the directory mechanism is in progress. The ERAT miss queue is configured to receive various control signals from an address translation unit portion of the LSS (222).

The ERAT miss queue is also configured to include a tracker to monitor a cache entry. The tracker within the ERAT miss queue has a corresponding tracker in the LRQ entry for the load instruction. Further, more than one LRQ entry may include corresponding trackers for the ERAT miss queue entry, if those LRQ entries store load instructions targeting the same cacheline (identified by an effective address) and have encountered a set predict hit and an ERAT miss. The trackers in the ERAT miss queue and the LRQ function to monitor the cache entry in order to detect any changes made to the cache entry during the ERAT update.

Determining (504) that the cache entry is unchanged upon completion of the ERAT update may be carried out by monitoring the cache entry during the ERAT update and once the ERAT update has completed, verifying that no changes were made to the cache entry. Determining (504) that the cache entry is unchanged upon completion of the ERAT update may include determining (506) that no store instruction targeting the cache entry has executed. Determining (506) that no store instruction targeting the cache entry has executed may be carried out by monitoring instructions targeting the cache entry and, once the ERAT update has completed, determining that no data was stored in the cache entry using the cache address. Determining (504) that the cache entry is unchanged upon completion of the ERAT update may also include determining that data has not been removed from the cache entry (e.g., by a snoop process) and/or determining that the cacheline stored in the cache entry has not been replaced with another cacheline.

Figure 6:
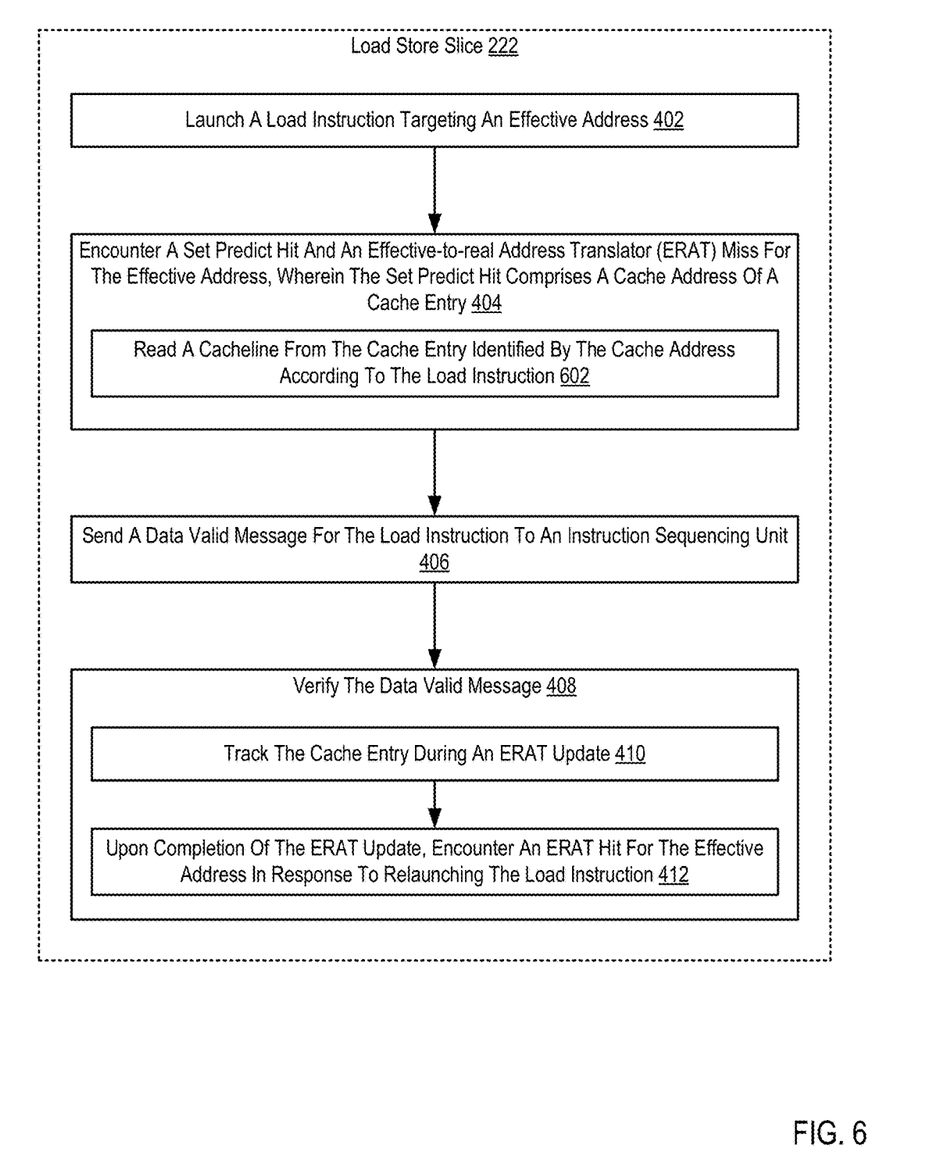
FIG. 6 sets forth a flow chart illustrating an exemplary method for flush avoidance in a load store unit according to embodiments of the present invention.

For further explanation, FIG. 6 sets forth a flow chart illustrating an exemplary method for flush avoidance in a load store unit according to embodiments of the present invention that includes launching (402) a load instruction targeting an effective address; encountering (404) a set predict hit and an ERAT miss for the effective address, wherein the set predict hit comprises a cache address of a cache entry; sending (406) a data valid message for the load instruction to an instruction sequencing unit (240); and verifying (408) the data valid message, wherein verifying the data valid message comprises: tracking (410) the cache entry during an ERAT update; and upon completion of the ERAT update, encountering (412) an ERAT hit for the effective address in response to relaunching the load instruction.

The method of FIG. 6 differs from the method of FIG. 4, however, in that encountering (404) a set predict hit and an ERAT miss for the effective address, wherein the set predict hit comprises a cache address of a cache entry includes reading (602) a cacheline from the cache entry identified by the cache address according to the load instruction. Reading (602) a cacheline from the cache entry identified by the cache address according to the load instruction may be carried out by initiating the reading of the cacheline shortly after encountering the set predict hit and before the directory mechanism determines whether the set predict hit is accurate.

Figure 7:
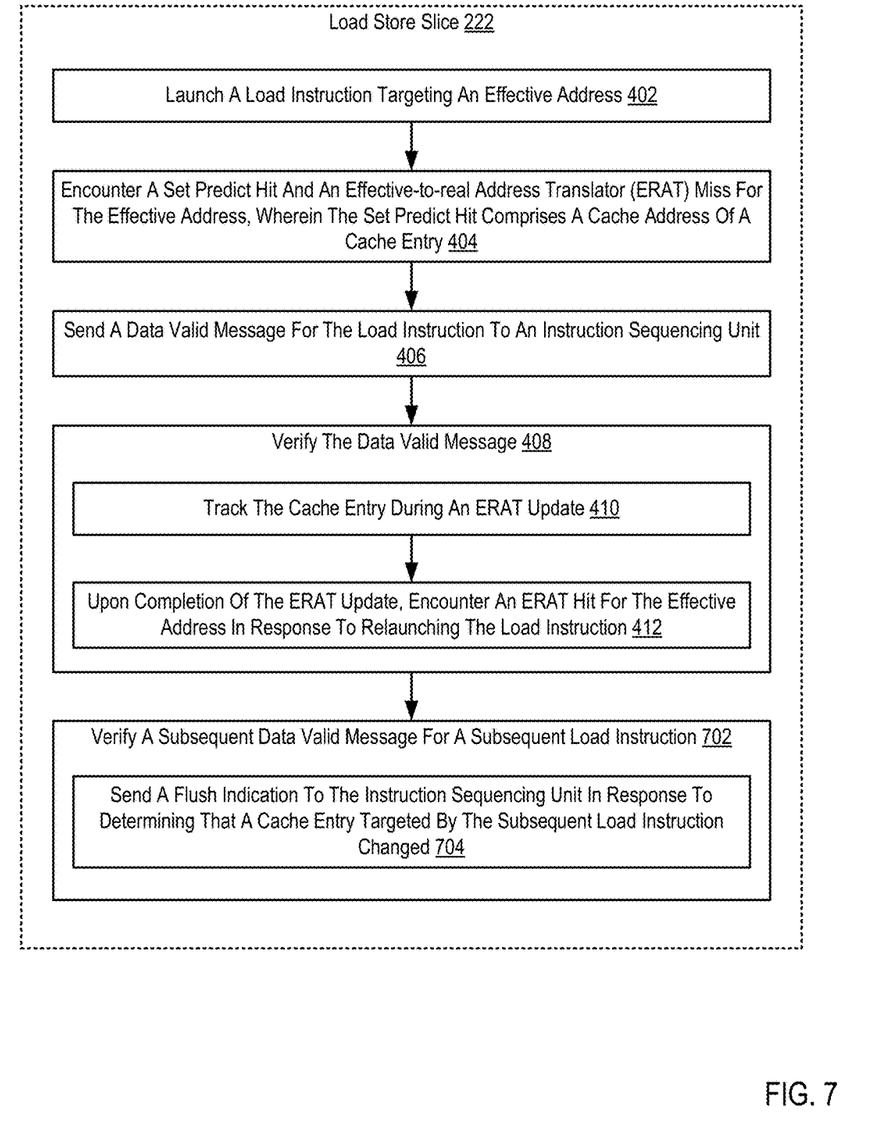
FIG. 7 sets forth a flow chart illustrating an exemplary method for flush avoidance in a load store unit according to embodiments of the present invention.

For further explanation, FIG. 7 sets forth a flow chart illustrating an exemplary method for flush avoidance in a load store unit according to embodiments of the present invention that includes launching (402) a load instruction targeting an effective address; encountering (404) a set predict hit and an ERAT miss for the effective address, wherein the set predict hit comprises a cache address of a cache entry; sending (406) a data valid message for the load instruction to an instruction sequencing unit (240); and verifying (408) the data valid message, wherein verifying the data valid message comprises: tracking (410) the cache entry during an ERAT update; and upon completion of the ERAT update, encountering (412) an ERAT hit for the effective address in response to relaunching the load instruction.

The method of FIG. 7 differs from the method of FIG. 4, however, in that the method of FIG. 7 further includes verifying (702) a subsequent data valid message for a subsequent load instruction. A subsequent load instruction may have also encountered a set predict hit and an ERAT miss, as described above. Verifying (702) a subsequent data valid message for a subsequent load may include sending (704) a flush indication to the instruction sequencing unit in response to determining that a cache entry targeted by the subsequent load instruction changed.

Sending (704) a flush indication to the instruction sequencing unit in response to determining that a cache entry targeted by the subsequent load instruction changed may be carried out by determining that a tracker in the ERAT miss queue for the cache entry has failed. The tracker for the subsequent load instruction may fail, for example, by determining that a store instruction targeting the cache entry has executed, determining that data has been removed from the cache entry (e.g., by a snoop process), and/or determining that the cacheline stored in the cache entry has been replaced with another cacheline.

Exemplary embodiments of the present invention are described largely in the context of a fully functional computer system for flush avoidance in a load store unit. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of flush avoidance in a load store unit, the method comprising:

launching a load instruction targeting an effective address;
encountering a set predict hit and an effective-to-real address translator (ERAT) miss for the effective address, wherein the set predict hit comprises a cache address of a cache entry;
sending a data valid message for the load instruction to an instruction sequencing unit prior to verifying the validity of the cache entry; and
verifying the data valid message, wherein verifying the data valid message comprises:
tracking the cache entry during an ERAT update, wherein during the ERAT update one or more entries for the effective address are added to the ERAT; and
upon completion of the ERAT update, encountering an ERAT hit for the effective address in response to relaunching the load instruction.

2. The method of claim 1, wherein tracking the cache entry during the ERAT update comprises:
determining that the cache entry is unchanged upon completion of the ERAT update.

3. The method of claim 2, wherein determining that the cache entry is unchanged upon completion of the ERAT update comprises determining that no store instruction targeting the cache entry has executed.

4. The method of claim 1, wherein tracking the cache entry during the ERAT update comprises:
placing a tracker in an ERAT miss queue to monitor the cache entry.

5. The method of claim 1, wherein encountering the set predict hit and the ERAT miss for the effective address comprises:
reading a cacheline from the cache entry identified by the cache address according to the load instruction.

6. The method of claim 1, further comprising:
verifying a subsequent data valid message for a subsequent load instruction, wherein verifying the subsequent data valid message comprises:
sending a flush indication to the instruction sequencing unit in response to determining that a cache entry targeted by the subsequent load instruction changed.

7. The method of claim 1, wherein relaunching the load instruction does not initiate a reading of the cacheline from the cache entry identified by the cache address.

8. A processor configured to carry out:
launching a load instruction targeting an effective address;
encountering a set predict hit and an effective-to-real address translator (ERAT) miss for the effective address, wherein the set predict hit comprises a cache address of a cache entry;
sending a data valid message for the load instruction to an instruction sequencing unit prior to verifying the validity of the cache entry; and
verifying the data valid message, wherein verifying the data valid message comprises:
tracking the cache entry during an ERAT update, wherein during the ERAT update one or more entries for the effective address are added to the ERAT; and
upon completion of the ERAT update, encountering an ERAT hit for the effective address in response to relaunching the load instruction.

9. The processor of claim 8, wherein tracking the cache entry during the ERAT update comprises:
determining that the cache entry is unchanged upon completion of the ERAT update.

10. The processor of claim 9, wherein determining that the cache entry is unchanged upon completion of the ERAT update comprises determining that no store instruction targeting the cache entry has executed.

11. The processor of claim 8, wherein tracking the cache entry during the ERAT update comprises:
placing a tracker in an ERAT miss queue to monitor the cache entry.

12. The processor of claim 8, wherein encountering the set predict hit and the ERAT miss for the effective address comprises:
reading a cacheline from the cache entry identified by the cache address according to the load instruction.

13. The processor of claim 8, further configured to carry out:
verifying a subsequent data valid message for a subsequent load instruction, wherein verifying the subsequent data valid message comprises:
sending a flush indication to the instruction sequencing unit in response to determining that a cache entry targeted by the subsequent load instruction changed.

14. The processor of claim 8, wherein relaunching the load instruction does not initiate a reading of the cacheline from the cache entry identified by the cache address.

15. An apparatus comprising a processor configured to carry out:
launching a load instruction targeting an effective address;
encountering a set predict hit and an effective-to-real address translator (ERAT) miss for the effective address, wherein the set predict hit comprises a cache address of a cache entry;
sending a data valid message for the load instruction to an instruction sequencing unit prior to verifying the validity of the cache entry; and
verifying the data valid message, wherein verifying the data valid message comprises:
tracking the cache entry during an ERAT update, wherein during the ERAT update one or more entries for the effective address are added to the ERAT; and
upon completion of the ERAT update, encountering an ERAT hit for the effective address in response to relaunching the load instruction.

16. The apparatus of claim 15, wherein tracking the cache entry during the ERAT update comprises:
determining that the cache entry is unchanged upon completion of the ERAT update.

17. The apparatus of claim 16, wherein determining that the cache entry is unchanged upon completion of the ERAT update comprises determining that no store instruction targeting the cache entry has executed.

18. The apparatus of claim 15, wherein tracking the cache entry during the ERAT update comprises:
placing a tracker in an ERAT miss queue to monitor the cache entry.

19. The apparatus of claim 15, wherein encountering the set predict hit and the ERAT miss for the effective address comprises:
reading a cacheline from the cache entry identified by the cache address according to the load instruction.

20. The apparatus of claim 15, the processor further configured to carry out:
verifying a subsequent data valid message for a subsequent load instruction, wherein verifying the subsequent data valid message comprises:
sending a flush indication to the instruction sequencing unit in response to determining that a cache entry targeted by the subsequent load instruction changed.

* * * * *